US008805411B2

(12) United States Patent
Furuta

(10) Patent No.: US 8,805,411 B2
(45) Date of Patent: Aug. 12, 2014

(54) SERVICE PROVISION SYSTEM

(71) Applicant: Denso Corporation, Kariya (JP)

(72) Inventor: Seiichi Furuta, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 13/709,368

(22) Filed: Dec. 10, 2012

(65) Prior Publication Data
US 2013/0150078 A1 Jun. 13, 2013

(30) Foreign Application Priority Data

Dec. 12, 2011 (JP) ................................. 2011-271153

(51) Int. Cl.
*H04W 24/00* (2009.01)
*G01S 19/48* (2010.01)
*H04W 4/20* (2009.01)
*H04W 64/00* (2009.01)
*H04W 4/04* (2009.01)

(52) U.S. Cl.
CPC ............... *H04W 24/00* (2013.01); *G01S 19/48* (2013.01); *H04W 4/20* (2013.01); *H04W 64/00* (2013.01); *H04W 4/046* (2013.01)
USPC .................................... 455/456.1; 455/456.6

(58) Field of Classification Search
USPC ................. 455/456.1, 456.6; 342/29, 30, 450
See application file for complete search history.

(56) References Cited

U.S. PATENT DOCUMENTS

| 2010/0138149 | A1 | 6/2010 | Ohta et al. |
| 2012/0054028 | A1* | 3/2012 | Tengler et al. ............. 705/14.49 |
| 2012/0088523 | A1 | 4/2012 | Shirakawa et al. |

FOREIGN PATENT DOCUMENTS

| JP | 2002-183475 | 6/2002 |
| JP | 2008-197930 | 8/2008 |
| JP | 2010-071918 | 4/2010 |
| WO | WO 2005/024346 | 3/2005 |

OTHER PUBLICATIONS

Office action dated Apr. 30, 2014 in corresponding Japanese Application No. 2011-271153.

* cited by examiner

*Primary Examiner* — Sam Bhattacharya
(74) *Attorney, Agent, or Firm* — Harness, Dickey & Pierce, PLC

(57) ABSTRACT

Under a state where a vehicular navigation apparatus and a cellular phone connect a Bluetooth communication link, the cellular phone acquires position information that is detected by the vehicular navigation apparatus and transmits the position information to a server. The server determines a position of a user who is provided with a service based on the position information received from the cellular phone, and provides the service to the user of which the position is determined.

15 Claims, 9 Drawing Sheets

FIG. 3

COUPON INFO STORAGE

| COUPON INFO ID | PAY APPA ID |
|---|---|
| 1001 | 9001 |
| 1002 | 9002 |
| 1003 | 9003 |
| 1004 | 9004 |
| 1005 | 9005 |
| 1006 | 9006 |
| 1007 | 9007 |
| ⋮ | ⋮ |

SERVICE PROVISION SYSTEM

CROSS REFERENCE TO RELATED APPLICATION

The present application is based on Japanese Patent Application No. 2011-271153 filed on Dec. 12, 2011, the disclosure of which is incorporated herein by reference.

TECHNICAL FIELD

The present disclosure relates to a service provision system including a portable terminal to detect a position based on GPS signals from GPS satellites, an in-vehicle apparatus to detect a position based on GPS signals from GPS satellites, and a server to receive position information from the portable terminal and transmit service information in response to the position information to the portable terminal.

BACKGROUND

Patent document 1: JP 2002-183475 A

Portable terminals such as cellular phones having a function to detect positions have been spreading in recent years. The position detecting function is used for a server to provide services that distribute service information such as coupon information and advertisement information according to the positions of the portable terminals. Moreover, Patent document 1 discloses a configuration to enable electronic commerce in in-vehicle apparatuses mounted in vehicles.

Further, in-vehicle apparatuses such as navigation apparatuses have a function to detect positions and time-series variations of the positions. Comparing the position detecting function of the in-vehicle apparatus with that of the portable terminals results in the following. The in-vehicle apparatus detects positions in reference to, in addition to detection results of the GPS receiver, detection results of other sensors such as a distance sensor or a gravitation sensor, monitoring results of vehicle information via a in-vehicle local area network such as a controller area network (CAN), and detail map information. In contrast, the portable terminal detects positions in reference to simple map information in addition to detection results of the GPS receiver, therefore providing a position detection accuracy lower than that of the in-vehicle apparatus.

This may preclude a significantly accurate detection of the position of the portable terminal to which the service information is provided, namely, the position of the user to which the service information is provided, in the service that distributes the service information from the server to the portable terminal using the position detecting function of the portable terminal. This may therefore not preclude a possibility to determine the position of the user inaccurately or incorrectly. Such a case may result in providing the service unsuitable to the position of the user or not providing the service sufficiently suitable to the position of the user.

SUMMARY

It is an object to provide a service provision system to improve an accuracy to detect a position of a user of a portable terminal, which a server provides with service information, enabling a suitable service provision.

To achieve the above object, according to an example of the present disclosure, a service provision system is provided to include a portable terminal, an in-vehicle apparatus, and a server. The portable terminal includes a terminal-side position detector to detect a first position based on a global positioning system (GPS) signal received from GPS Satellites. The in-vehicle apparatus is mounted to a vehicle and includes a vehicle-side position detector to detect a second position based on a GPS signal received from GPS Satellites. The server receives position information from the portable terminal, determines service information in response to the position information received, and transmits the service information to the portable terminal. Herein, the portable terminal acquires the second position detected by the vehicle-side position detector from the in-vehicle apparatus and transmits the second position as the position information to the server when the portable terminal is communicated with the in-vehicle apparatus. In contrast, the portable terminal transmits the first position detected by the terminal-side position detector as the position information to the server when the portable terminal is not communicated with the in-vehicle apparatus.

Under a such configuration, when (i) the accuracy to detect the position by the in-vehicle apparatus is higher than the accuracy to detect the position by the portable terminal and (ii) the portable terminal and the in-vehicle apparatus communicate with each other, the portable terminal transmits to the server the position information detected by the vehicle-side position detector having a higher accuracy than the position information detected by the terminal-side position detector. The server may therefore determine the user's position with a sufficient accuracy based on the position information with the high accuracy received from the portable terminal. The service information according to the higher accurate position information can be transmitted to the portable terminal, enabling a suitable provision of the service responding to the position of the user.

Moreover, even if the portable terminal and in-vehicle apparatus do not communicate with each other, the portable terminal transmits the position information detected by the terminal-side position detector to the server although the accuracy is inferior to that of the vehicle-side position detector. The server may determine the user's position based on the position information received from the portable terminal, transmitting the service information according to the position information to the portable terminal. A suitable provision of the service responding to the position of the user is enabled to preclude the state where none of the service is provided to the user.

That is, when needing a higher accurate position in receiving a service from a service provider, the portable terminal and in-vehicle apparatus are connected to communicate with each other, thereby transmitting the higher accurate position information to the server and receiving a suitable service from the service provider. In contrast, when not needing a higher accurate position in receiving a service from a service provider, the portable terminal and in-vehicle apparatus are not connected to communicate with each other, thereby transmitting the lower accurate position information to the server and receiving a suitable service from the service provider.

BRIEF DESCRIPTION OF THE DRAWINGS

The above and other objects, features, and advantages of the present disclosure will become more apparent from the following detailed description made with reference to the accompanying drawings. In the drawings:

FIG. 3 is a diagram illustrating a coupon information storage region in a center apparatus;

DETAILED DESCRIPTION

Figure 1:
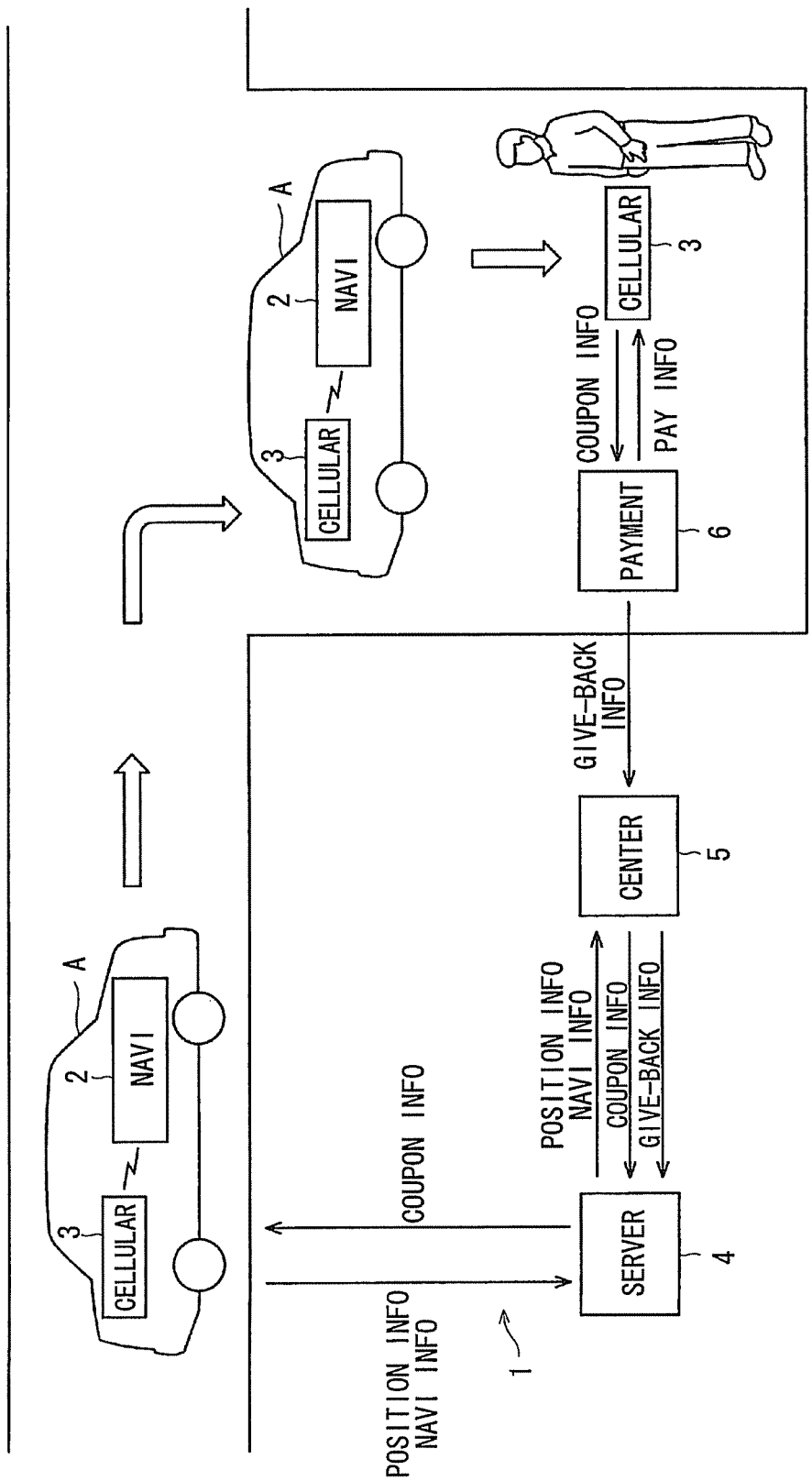
FIG. 1 is a diagram illustrating an overall configuration of an embodiment of the present disclosure.

The following will explain a service provision system where a server provides a service of distributing coupon information as service information to a user who is in a subject vehicle according to an embodiment of the present disclosure, with reference to the drawings. With reference to FIG. 1, the service provision system 1 includes the following: a vehicular navigation apparatus 2 as an in-vehicle apparatus, which is mounted in a subject vehicle A and has a Bluetooth (registered trademark, referred to as BT) communication function; a cellular phone 3 as a portable terminal, which a user such as a driver in the subject vehicle A has brought into the subject vehicle A and has a BT communication function; a server 4 and a center apparatus 5 provided in a communication network; and a payment apparatus 6 (also referred to as a point-of-sale (POS) apparatus) as a service provider disposed at a shop. The shop having the payment apparatus 6 includes a shop, which is disposed in a service area attached to an expressway as an automobile-only road and is accessible from the expressway, or a shop, which is attached to or along a general road and accessible from the general road.

Figure 2:
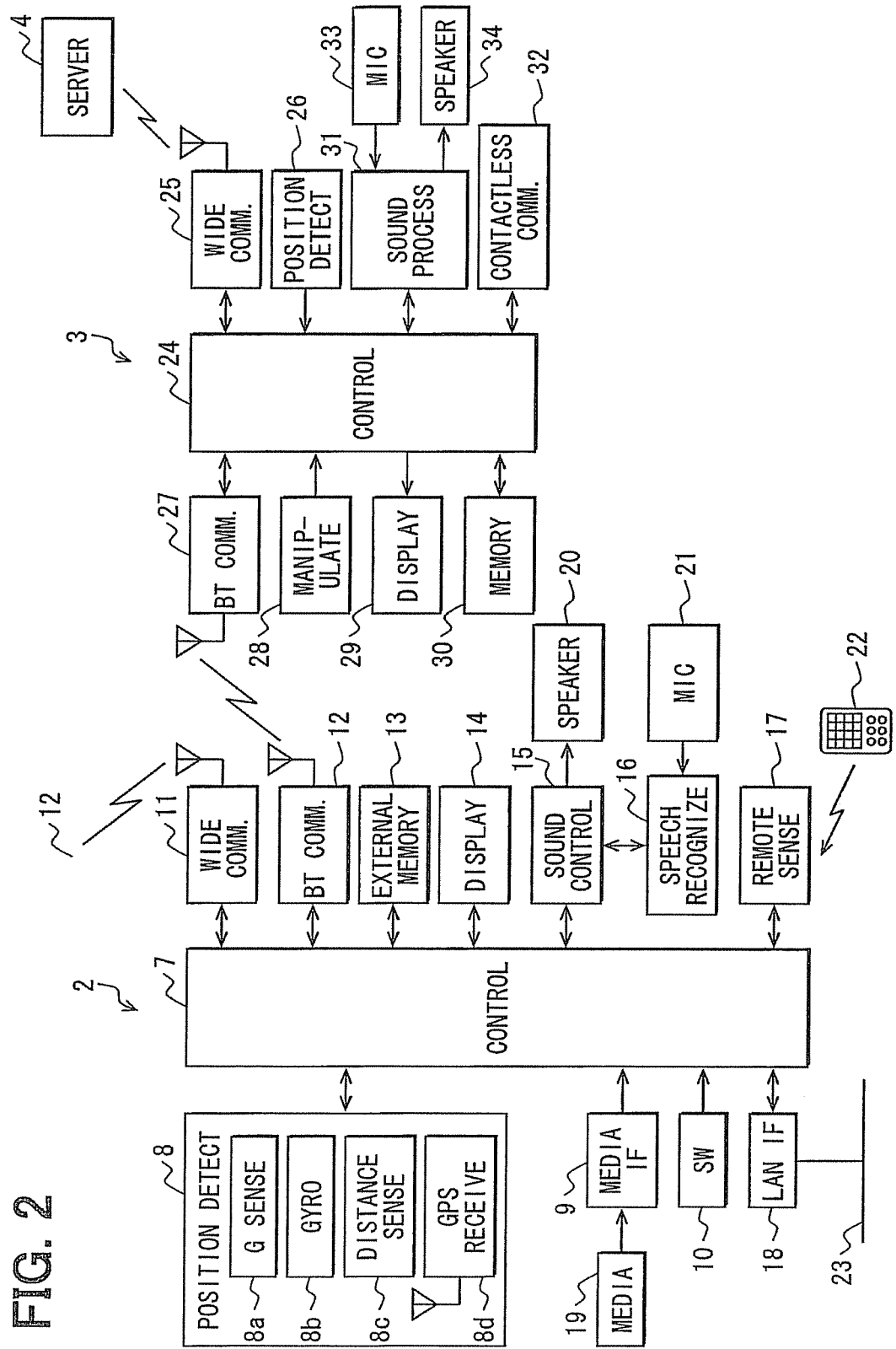
FIG. 2 is a block diagram illustrating a configuration of a vehicular navigation apparatus and a cellular phone.

With reference to FIG. 2, the vehicular navigation apparatus 2 includes the following: a control circuit 7, which may also function as a vehicle-side encryption section, device, or means and a navigation information acquirer, acquisition section, device, or means; a position detector 8, which may also referred to as a vehicle-side position detector, or vehicle-side detection portion, device, or means; a storage media reception portion 9; a manipulation switch group 10; a wide area communicator 11; a BT communicator 12; an external memory 13; a display portion 14; a sound controller 15; a speech recognition portion 16; a remote control sensor 17; and a vehicle LAN interface portion 18, which is also referred to as a vehicle information acquirer, or a vehicle information acquisition portion, device, or means.

The control circuit 7 includes a known microcomputer having a CPU, a RAM, a ROM, and an I/O bus, executing a control program to control overall operation of the vehicular navigation apparatus 2. The position detector 8 includes a G sensor 8a, a gyroscope 8b, a distance sensor 8c, and a GPS (Global Positioning System) receiver 8d. The GPS receiver 8d receives GPS signals from several GPS satellites, and extracts various parameters from the received GPS signals, detecting a position. The G sensor 8a, the gyroscope 8b, the distance sensor 8c, and the GPS receiver 8d have mutually different types of detection errors. The detection results of the respective sensors are complemented mutually, detecting as position information a present position of the vehicular navigation apparatus 2 or the position of the vehicle to output to the control circuit 7. In addition, the position detector 8 may not need all the sensors or the like, depending on required detection accuracy. Moreover, the position detector 8 may further include a steering sensor for detecting a steering angle, and a wheel sensor for detecting rotation of wheels.

The storage media reception portion 9 receives a storage media 19, such as a CD-ROM, DVD-ROM, HDD, and memory card. The storage media 19 records or stores map information, road information, mark information, and information for map matching. The map information recorded on the storage media 19 is detailed information having a data volume much more than that in a memory 30 of the cellular phone 3 mentioned later. The manipulation switch group 10 includes mechanical keys which are arranged around the display portion 14 or touch-sensitive keys which are formed on the display portion 14. The manipulation switch group 10 detects a user's manipulation to any key to thereby output a corresponding manipulation detection instruction or signal to the control circuit 7.

The wide area communicator 11 performs a wide area wireless communication so as to receive VICS (Vehicle Information Communication System, registered trademark) from a VICS apparatus, for example. The BT communicator 12 establishes a connection of the BT communication link with the cellular phone 3. Under the state where the BT communication link is connected, the BT communication is executed with the cellular phone 3. The external memory 13 includes a high-data-capacity storage unit such as a HDD. The display portion 14 includes, for example, a liquid crystal display. The display portion 14 displays various kinds of display windows, such as a menu window and a destination designation window while superimposing a present position mark for indicating a present position of the vehicle, a vehicular swept path, and the like on a map generated from map information. In addition, the display portion 14 may include an organic electroluminescence (EL) or a plasma display.

The sound controller 15 controls the speech recognition portion 16 and outputs, for example, a route guidance message, a warning message via the speaker 20. The speech recognition portion 16 performs speech recognition of sounds or speeches inputted via the microphone 21 based on a speech-recognition algorithm. The remote control sensor 17 receives a manipulation detection signal transmitted from a remote control 22, detects a corresponding manipulation instruction executed by a user via the remote control 22, and outputs a manipulation detection signal indicating the manipulation instruction to the control circuit 7. The vehicle LAN interface portion 18 is connected with various ECUs (unshown) and the various sensors (unshown) which are mounted in the subject vehicle via an in-vehicle local area network (LAN) 23 to input and output various data or various signals with the ECUs and sensors.

The control circuit 7 has known functions for navigating the vehicle as follows: a map matching function performing a map matching process to designate a road where the present position of the vehicle is located by using road data included in the map information and the detected present position of the vehicle; a route retrieval function retrieving a route to a destination designated by a user from the present position designated by the map matching process; a route guidance function performing route guidance by calculating a point required for route guidance based on road data and positions of intersections contained in the map information, and retrieved route; and an image rendering function rendering a peripheral map around a present position of the vehicle, a schematic drawing of a highway, and an enlarged view near an intersection.

The cellular phone 3 includes the following: a control circuit 24, which may function as a terminal-side encryption section, device, or means; a wide area communicator 25; a position detector 26, which may be referred to as a terminal-side position detector or a terminal-side position detection portion, device, or means; a BT communicator 27; a manipulation portion 28; a display portion 29; a memory 30; a sound processing portion 31; and a contactless communicator 32. The control circuit 24 includes a known microcomputer having a CPU, a RAM, a ROM, and an I/O bus, executing a control program to control overall operations of the cellular phone 3. The wide area communicator 25 establishes a connection of the wide area communication link with the server 4. Under the state where the wide area communication link is connected, the wide area communication is executed with the server 4. The position detector 26 is equipped with a GPS receiver to receive GPS signals from GPS satellites. The GPS receiver receives GPS signals from GPS satellites, similar to the above-mentioned GPS receiver 8d, extracts various parameters from the received GPS signals and calculates the position of the cellular phone 3 as position information, outputting to the control circuit 24. The BT communicator 27 establishes a connection of the BT communication link with the vehicular navigation apparatus 2. Under the state where the BT communication link is connected, the BT communication is executed with the vehicular navigation apparatus 2.

The manipulation portion 28 includes multiple keys such as a power key, and numeral keys "0" to "9" and outputs manipulation detection signals indicating specifics of a manipulation to the control circuit 24 when the manipulation is made to one of the keys. The display portion 29 includes, for example, a liquid crystal display. The display portion 29 displays various display windows, such as a standby window and an incoming call notice window. The memory 30 stores map information and phonebook information that indicates a correspondence between phone numbers and registered names. The map information stored in the memory 30 is information having a data-volume smaller or simpler than the map information recorded in the above-mentioned storage media 19 used in the vehicular navigation apparatus 2.

The sound processing portion 31 is connected with a microphone 33 which inputs as a transmission sound a speech uttered by the user, and a speaker 34 which outputs as a reception sound a speech received from a call partner. The sound processing portion 31 carries out sound processing for the reception sound outputted via the speaker 34 while carrying out sound processing for the transmission sound inputted via the microphone 33. The contactless communicator 32 performs contactless communication with a contactless communicator of the payment apparatus 6.

The position detecting function of the vehicular navigation apparatus 2 and that of the cellular phone 3 will be compared below. The vehicular navigation apparatus 2 detects a position as follows. The position detector 8 includes, in addition to the GPS receiver 8d, the G sensor 8a, the gyroscope 8b, and the distance sensors 8c, complements mutually the detection results of such sensors, and refers to the detailed map information recorded in the storage media 19, thereby detecting a position. In contrast, in the cellular phone 3, the position detector 26 has only the GPS receiver and refers to the simple map information stored in the memory 30, thereby detecting a position. Thus, the accuracy of the position detected by the vehicular navigation apparatus 2 is higher than that of the cellular phone 3. Suppose that a general road runs or is parallel with an expressway. The vehicular navigation apparatus 2 may determine whether the vehicle A runs the expressway or the general road. The cellular phone 3, by contrast, may not determine whether the vehicle A runs the expressway or the general road. It is noted that the vehicular navigation apparatus 2 may also detect a position by further using a monitoring result of the information communicated in the vehicular LAN such as CAN.

The performances of the GPS receivers of the vehicular navigation apparatus 2 and the cellular phone 3 are differentiated from each other in respect of the accuracy. This is because the number of the GPS satellites used by the vehicular navigation apparatus 2 is larger than that of the cellular phone 3. Furthermore, the position detector 8 of the vehicular navigation apparatus 2 receives the vehicle information such as an acceleration, yaw rate, steering wheel angle, accelerator opening, braking pressure, blinker operation, surrounding image, outside air temperature, and humidity, via the vehicular LAN interface portion 18 and detects or amends the position by further using the received vehicle information, permitting a detection of the higher-precision position information.

The server 4 and the center apparatus 5 are provided in the communication network by a third party administrative authority such as a communication company so as to provide services to users who possesses cellular phones 3. The server 4 and the center apparatus 5 connect a wide area communication link with the cellular phones 3 and the payment apparatuses 6. It is noted that the wide area network signifies a communication network that interconnects fixed-line communication networks and mobile communication networks mutually. In this case, services may be provided to many and unspecified cellular phones 3 that may be enabled to connect the wide area communication link with the servers 4. Alternatively, services may be provided to only cellular phones 3 with which contracts are made previously, and such cellular phones 3 may be enabled to connect the wide area communication link with the servers 4. The center apparatus 5 manages the positions where the shops to provide services, and the roads along which the shops are disposed.

The payment apparatus 6 is installed at a shop that is managed by the center apparatus 5. Users can purchase goods at such a shop; the payment apparatus 6 makes payment when the users purchase goods at the shop. The payment apparatus 6 includes a scanner which reads code information such as one-dimensional codes (for example, bar code) and two-dimensional codes (for example, QR Code (registered trademark)), and a display portion that displays the varieties of information such as price information and merchandise information recorded on the read code information. A salesperson or salesclerk of the shop manipulates the scanner of the payment apparatus 6 to read the code information printed in the code label attached to the goods which the user or buyer of goods purchases. The display portion thereby displays a varieties of information such as price information and merchandise information recorded on the read code information. The salesperson collects the purchase price (counter-value) from the user to make settlement. Moreover, the payment apparatus 6 may read not only the code information printed in the code label attached to the goods which the user or buyer of goods purchases, but also the code information displayed on the display portion 29 of the cellular phone 3 which the user holds.

Moreover, the payment apparatus 6 prepares the coupon information, which provides an advantage or an added value such as a discount to the user when the user or buyer purchases goods, transmitting the prepared coupon information to the center apparatus 5 via the wide area communication link. It is noted that the payment apparatus 6 may prepare the coupon information and transmit it in various manners. For example, the coupon information may be prepared in consideration of various important factors such as inventory time, inventory number, sales position, and circulation route of goods. The prepared coupon information may be transmitted immediately after preparing it. The coupon information prepared by the previous day may be transmitted collectively just before opening of the shop. The coupon information prepared at that day may be transmitted collectively immediately after closing of the shop. Moreover, the payment apparatus 6 further includes a contactless communicator which performs contactless communication with the contactless communicator 32 of the cellular phone 3.

The center apparatus 5 receives the coupon information transmitted from the payment apparatus 6 via the wide area communication link, thereby obtaining the coupon information from the payment apparatus 6. With reference to FIG. 3, the center apparatus 5 is provided with a coupon information storage area to store the correspondence between the coupon information ID, which can identify coupon information, and the payment apparatus ID, which can identify the payment apparatus 6 that transmitted the coupon information. Whenever receiving the coupon information transmitted from the payment apparatus 6 via the wide area communication link, the center apparatus 5 additionally stores the received coupon information to thereby update the coupon information storage area one by one.

The following will explain an operation under the above configuration with reference to FIGS. 4 to 9. It is premised that a user brings the cellular phone 3 into the compartment of the vehicle A, drives the vehicle A, and visits a shop along the road on the way. Now, in a state that the cellular phone 3 is brought in the vehicle compartment, the cellular phone 3 may be in a power-on state and the vehicular navigation apparatus 2 may be in a power-on state to enable the use of the navigation function. In such two-party power-on case, the vehicular navigation apparatus 2 and the cellular phone 3 automatically connect the BT communication link; the applications preset to start by the power-on are started in the two parties; and some applications cooperatively operate to permit the vehicular navigation apparatus 2 and the cellular phone 3 to cooperatively operate. In contrast, even when the cellular phone 3 is in the power-on state, the vehicular navigation apparatus 2 may be in a power-off state to preclude the use of the navigation function. In such cellular-alone power-on state, the vehicular navigation apparatus 2 and the cellular phone 3 do not automatically connect the BT communication link; any applications do not cooperatively operate; and the cellular phone 3 operates alone. The following will explain two cases of (1) the two-party cooperative state to permit the vehicular navigation apparatus 2 and the cellular phone 3 to cooperatively operate, and (2) the cellular singly-operative state to permit the cellular phone 3 to singly operate, in a state that the cellular phone 3 is brought in the vehicle compartment.

Further, the user can select a coupon cooperative mode and a coupon singly-operative mode in the cellular phone 3. The coupon cooperative mode prioritizes a coupon stored in the two-party cooperative state in which the vehicular navigation apparatus 2 and the cellular phone 3 cooperatively operate. The coupon singly-operative mode prioritizes a coupon stored in the cellular singly-operative state in which the cellular phone 3 operates singly. In cases that the coupon cooperative mode is selected in the cellular phone 3, the coupon information stored during the two-party cooperative state is held in a valid state even when the BT communication link is disconnected between the vehicular navigation apparatus 2 and the cellular phone 3 after the user exits from the vehicle. Further, the coupon singly-operative mode may be selected in cases that the user walks or uses public transportation without bringing the cellular phone 3 into the vehicle compartment.

It is further noted that a sequence diagram in the present application includes sections (also referred to as steps), which are represented, for instance, as A1, B1 or the like. Further, each section can be divided into several sub-sections while several sections can be combined into a single section. Furthermore, each of thus configured sections can be referred to as a device, module, processor, or means and achieved not only (i) as a software section in combination with a hardware unit (e.g., computer), but also (ii) as a hardware section, including or not including a function of a related apparatus. Further, the hardware section may be inside of a microcomputer.

Figure 4:
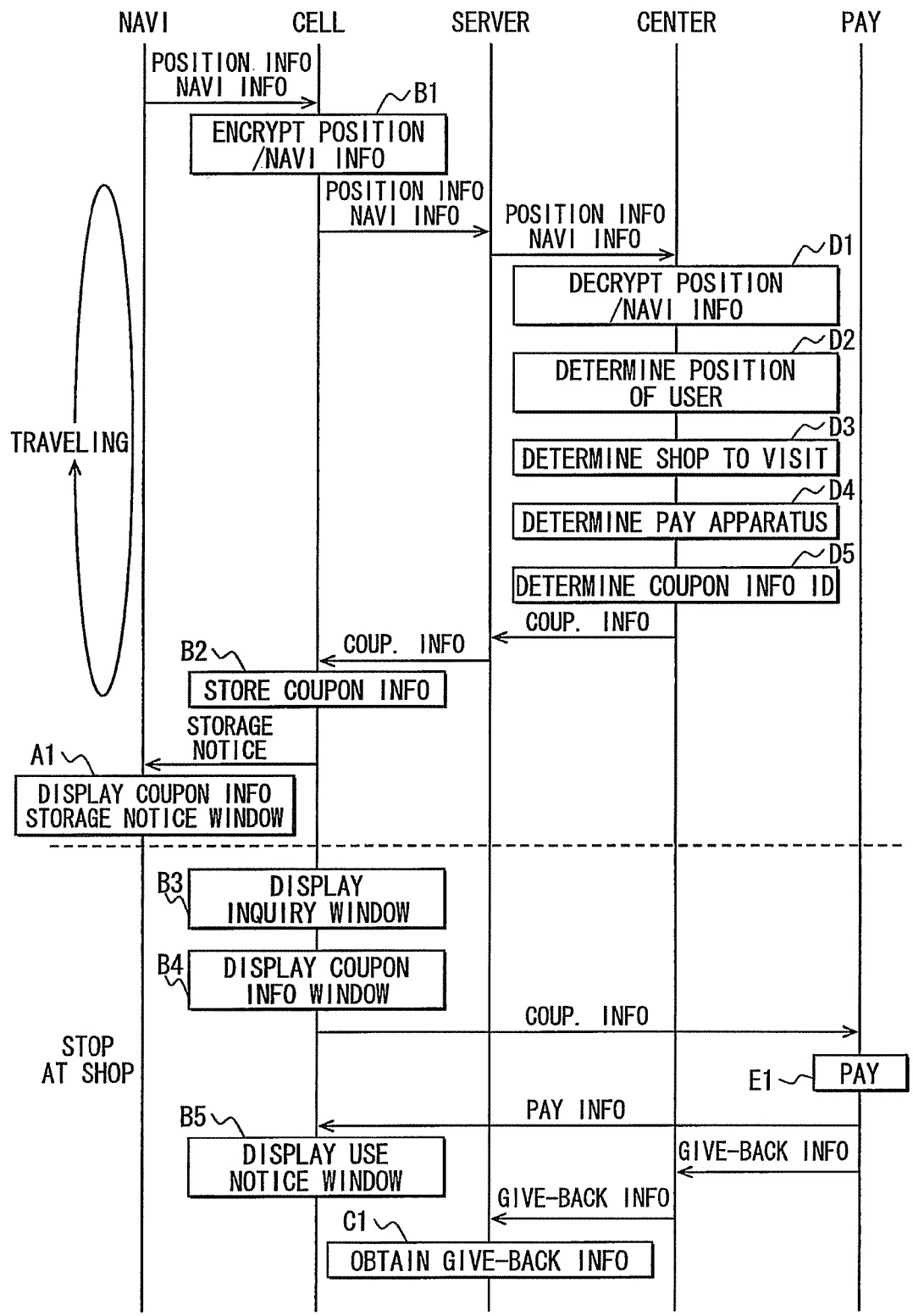
FIG. 4 is a sequence diagram.

(1) Two-Party Cooperative State to Permit the Vehicular Navigation Apparatus 2 and the Cellular Phone 3 to Cooperatively Operate Refer to FIG. 4. The present situation is as follows: the user drives the vehicle A and travels a road; the vehicular navigation apparatus 2 and the cellular phone 3 connect the Bluetooth communication link therebetween; and the two-party cooperative state takes place. The vehicular navigation apparatus 2 operates as follows. The control circuit 7 obtains the navigation information such as destination, route from a present position to the destination, estimated travel time up to the destination, classes and road widths of roads traveled, and receives the position information detected by the position detector 8 periodically, i.e., every fixed time or fixed travel distance. The control circuit 7 transmits the navigation information and the position information periodically, i.e., every fixed travel time or fixed travel distance, from the BT communicator 12 to the cellular phone 3 via the BT communication link.

In contrast, the cellular phone 3 operates as follows. When determining the reception of the position information and navigation information transmitted from the vehicular navigation apparatus 2 by the BT communicator 27 via the BT communication link, the control circuit 24 encrypts the position information and navigation information (B1), transmitting the position information and navigation information which are encrypted to the server 4 via the wide area communication link from the wide area communicator 25.

When determining the reception of the position information and navigation information, which are transmitted from the cellular phone 3 and are encrypted, via the wide area communication link, the server 4 transmits the position information and navigation information to the center apparatus 5 via the wide area communication link.

When determining the reception of the position information and navigation information, which are transmitted from the server 4 and are encrypted, via the wide area communication link, the center apparatus 5 decrypts the position information and navigation information which are encrypted (D1), and determines the position of the cellular phone 3 or the user of the cellular phone 3 based on the position information and navigation information which are decrypted (D2).

The center apparatus 5 then determines a shop which is expected to be visited by the user of the cellular phone 3 based on the determined position of the cellular phone 3 (D3). That is, the center apparatus 5 determines the time-series variation of the positions determined based on the position information received from the cellular phone 3, thereby determining the heading direction of the user or the vehicle A, which the cellular phone 3 is brought into, and the shop along the road in the heading direction determined as a shop that the user is expected to visit. The user may register own preference via the vehicular navigation apparatus 2 previously; the information about the user's preference may be transmitted to the center apparatus 5 from the vehicular navigation apparatus 2. After taking the user's preference into consideration, the center apparatus 5 may determine a shop that the user is expected to visit from now on. For example, the user may register "European food" and "books." The center apparatus 5 determines preferentially the shop about the "European food" and "books" as a shop which the user is expected to visit from now on.

The center apparatus 5 determines the payment apparatus 6 installed at the shop which the user is expected to visit (D4), determines the coupon information ID corresponding to the payment apparatus 6 determined with reference to the coupon information storage area (D5), and transmits the coupon information corresponding to the coupon information ID determined to the server 4 via the wide area communication link. That is, the center apparatus 5 transmits the coupon information available at the payment apparatus 6, which the user is expected to visit, to the server 4 via the wide area communication link.

When receiving the coupon information transmitted from the center apparatus 5 via the wide area communication link, the server 4 transmits the received coupon information to the cellular phone 3 which transmitted the position information and navigation information originally.

In the cellular phone 3, when receiving the coupon information transmitted from the server 4 by the wide area communicator 25 via the wide area communication link, the control circuit 24 stores the received coupon information to be associated with the payment apparatus 6 in the memory 30 (B2), transmitting a coupon information storage notice signal which indicates that the coupon information is stored in the memory 30 to the vehicular navigation apparatus 2 via the BT communication link from the BT communicator 27.

Figure 6A:
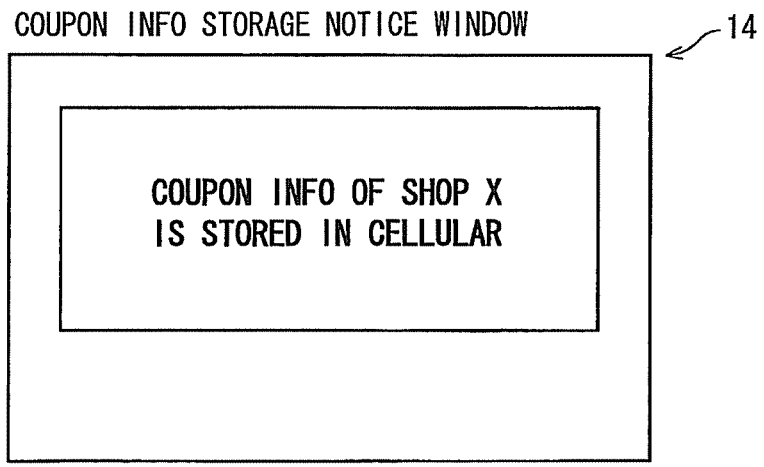
FIGS. 6A, 6B are diagrams illustrating various display windows in the vehicular navigation apparatus.

In contrast, in the vehicular navigation apparatus 2, when determining the reception of the coupon information storage notice signal transmitted from the cellular phone 3 by the BT communicator 12 via the BT communication link, the control circuit 7 displays a coupon information storage notice window that reports that the coupon information is stored in the cellular phone 3 in the display portion 14 (A1), as illustrated in FIG. 6A. The user in the vehicle A can confirm the coupon information storage notice window to thereby confirm that the coupon information is stored in the cellular phone 3. It is noted that the control circuit 7 may announce a voice message that reports that the coupon information is stored in the cellular phone 3 via the speaker 20 without being limited to displaying the coupon information storage notice window in the display portion 14.

Thus, when the vehicular navigation apparatus 2 and the cellular phone 3 cooperatively operate while the user drives the vehicle A and travels a road, the vehicular navigation apparatus 2, the cellular phone 3, the server 4, and the center apparatus 5 cooperate, thereby continuously operating a series of processing described in the above. Further, in the vehicular navigation apparatus 2, when the vehicle A passes the shop where the coupon information is available, the control circuit 7 transmits the coupon information clear instruction signal to the cellular phone 3 via the BT communication link from the BT communicator 12, thereby erasing the coupon information available at the shop and stored in the memory 30 of the cellular phone 3.

The following will explain the case that the user visits the shop along the road on the way. When the user exits from the vehicle A to visit the shop while carrying the cellular phone 3, the cellular phone 3 moves from inside of the BT communication area of the vehicular navigation apparatus 2 to outside of the BT communication area.

Figure 7A:
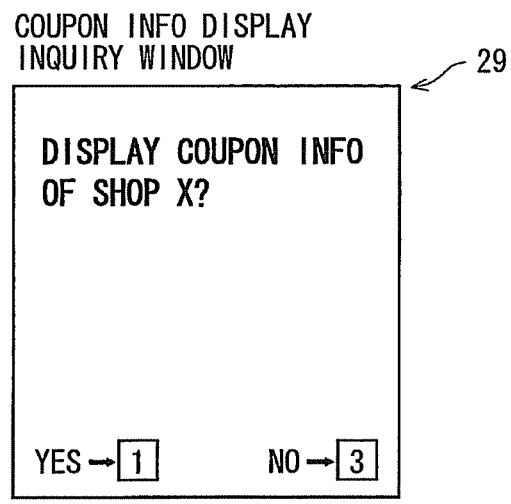
FIGS. 7A, 7B, 7C are diagram illustrating various display windows in the cellular phone.

The control circuit 24 in the cellular phone 3 thereby determines that the BT communicator 27 disconnected the BT communication link. This triggers the determination as to whether the coupon information is stored in the memory 30. When determining that the coupon information is stored in the memory 30, the control circuit 24 displays a coupon information display inquiry window which asks the user whether to display the coupon information in the display portion 29 (B3), as illustrated in FIG. 7A. In such a case, the user can select whether to display the coupon information or not.

Figure 7B:

When determining that the user selects displaying the coupon information and presses the "1" key serving as "YES" on the coupon information display inquiry window, the control circuit 24 reads out the coupon information stored in the memory 30 at the time and displays in the display portion 29 the coupon information window drawing the read coupon information as the code information such as two-dimensional code (e.g., QR Code) to report the coupon information (B4), as illustrated in FIG. 7B.

When purchasing goods at the shop which prepared the coupon information, the user holds up the cellular phone 3 such that the window or screen of the display portion 29 of the cellular phone 3 faces the scanner of the payment apparatus 6, permitting the scanner of the payment apparatus 6 to read the coupon information currently displayed in the display portion 29 of the cellular phone 3. When determining that the reading of the coupon information currently displayed in the display portion 29 of the cellular phone 3 is successful, the payment apparatus 6 reflects the coupon information on the price of the goods the user purchases to give a discount, for example (E1). When the settlement of accounts or payment is completed, the payment apparatus 6 transmits the payment information which indicates that the payment is made using the coupon information to the cellular phone 3 by the contactless communicator via the contactless communication.

Figure 7C:
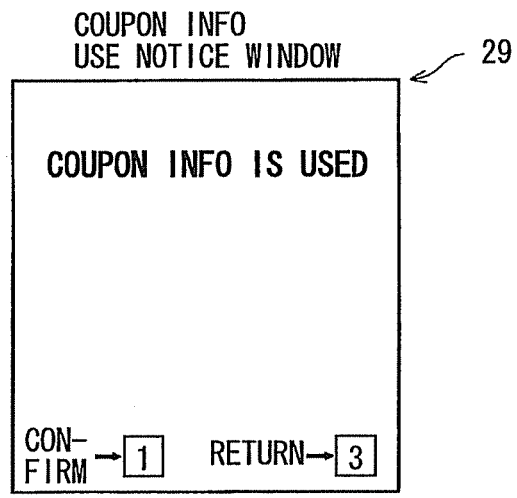

In the cellular phone 3, when determining that the contactless communicator 32 receives the payment information transmitted from the payment apparatus 6, the control circuit 24 displays a coupon information use notice window that notifies the user that the payment is made using the coupon information in the display portion 29 (B5), as illustrated in FIG. 7C. In this case, the control circuit 24 may display the specifics of the coupon information. For example, when the coupon information provides a discount to the price, the discounted amount of money or discounted rate may be displayed.

After transmitting the payment information to the cellular phone 3 from the contactless communicator, the payment apparatus 6 transmits the give-back information which indicates that the payment is made using the coupon information to the center apparatus 5 via the wide area communication link. When receiving the give-back information transmitted from the payment apparatus 6 via the wide area communication link, the center apparatus 5 transmits the received give-back information to the server 4 via the wide area communication link. The server 4 receives the give-back information transmitted from the center apparatus 5 via the wide area communication link, thereby acquiring the give-back information (C1). The give-back information transmitted to the server 4 from the payment apparatus 6 is, for example, an index such as a valuable value which indicates that the coupon information is used. The profit that the shop obtained from the user purchasing goods using the coupon information is partially returned to the third-party administrative entity or authority that manages the server 4.

The above explained the case that the user drives the vehicle A and travels a road, whereas the vehicular navigation apparatus 2 and the cellular phone 3 cooperatively operate during traveling the road. In such a case, the position information detected by the vehicular navigation apparatus 2 is transmitted to the server 4 from the cellular phone 3. The user can thereby acquire the coupon information available at the shop according to the position information. When the user makes payment using the coupon information, the give-back information is transmitted to the server 4 from the payment apparatus 6. The profit that the shop obtained from the user purchasing goods using the coupon information is partially returned to the third-party administrative entity managing the server 4.

Figure 5:
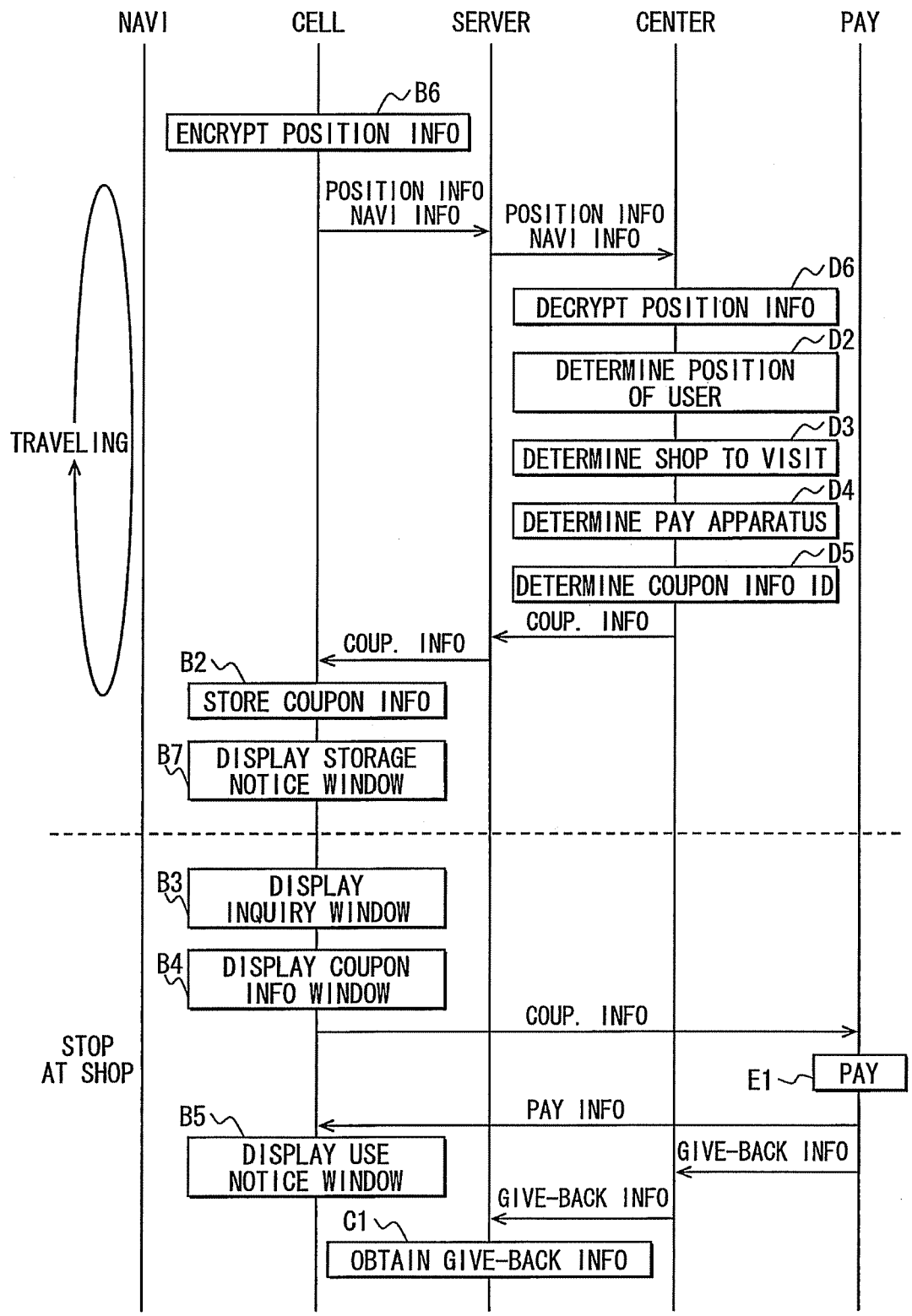
FIG. 5 is another sequence diagram.

(2) The Cellular Singly-Operative State to Permit the Cellular Phone 3 to Singly Operate The user drives the vehicle A and travels a road. In this case, however, the vehicular navigation apparatus 2 and the cellular phone 3 do not connect the BT communication link. The cellular phone 3 thereby operates singly. With reference to FIG. 5, without receiving the position information and navigation information transmitted from the vehicular navigation apparatus 2 by the BT communicator 27 via the BT communication link, the control circuit 24 in the cellular phone 3 encrypts the position information detected by the own position detector 26 (B6), and transmits the position information encrypted periodically, i.e., every fixed travel time or fixed travel distance, from the wide area communicator 25 to the server 4 via the wide area communication link. When determining the reception of the position information, which is transmitted from the cellular phone 3 and encrypted, via the wide area communication link, the server 4 transmits the position information encrypted to the center apparatus 5 via the wide area communication link.

When determining the reception of the position information, which is transmitted from the server 4 and encrypted, via the wide area communication link, the center apparatus 5 decrypts the received position information which is encrypted (D11), and determines the position of the cellular phone 3 or the user of the cellular phone 3 based on the position information decrypted (D2). Thereafter, the center apparatus 5 operates as follows, similar to the two-party cooperative state to permit the vehicular navigation apparatus 2 and the cellular phone 3 to cooperatively operate. That is, the center apparatus 5 determines the shop that the user of the cellular phone 3 is expected to visit (D3), determines the payment apparatus 6 installed at the shop which the user is expected to visit (D4), determines the coupon information ID corresponding to the payment apparatus 6 determined (D5), and transmits the coupon information corresponding to the coupon information ID determined to the server 4 via the wide area communication link. When receiving the coupon information transmitted from the center apparatus 5 via the wide area communication link, the server 4 transmits the received coupon information to the cellular phone 3 which transmitted the position information originally or previously.

In the cellular phone 3, when receiving the coupon information transmitted from the server 4 by the wide area communicator 25 via the wide area communication link, the control circuit 24 stores the received coupon information to be associated with the payment apparatus 6 in the memory 30 (B2). The control circuit 24, however, does not transmit a coupon information storage notice signal which indicates that the coupon information is stored in the memory 30 to the vehicular navigation apparatus 2 via the BT communication link from the BT communicator 27. The control circuit 24 displays a coupon information storage notice window that reports that the coupon information is stored in the cellular phone 3 in the display portion 29 (B7). The user in the vehicle A can confirm the coupon information storage notice window to thereby confirm that the coupon information is stored in the cellular phone 3. The control circuit 24 may not be limited to displaying the coupon information storage notice window in the display portion 29. The voice message which announces that the coupon information is stored in the cellular phone 3 may be outputted from the speaker 34. Displaying the window and announcing the voice message may be used together.

Thus, when the user drives the vehicle A and travels a road whereas the cellular phone 3 operates singly during traveling the road, a series of above-mentioned processing are continuously performed by the cellular phone 3, the server 4, and the center apparatus 5 cooperatively operating as described above. When the vehicle A passes the shop where the coupon information is available, the control circuit 24 of the cellular phone 3 thereby erases the coupon information available at the shop and stored in the memory 30 of the cellular phone 3.

The following will explain the case that the user visits the shop along the road on the way. In this case, disconnecting the BT communication link cannot be any trigger. For example, a predetermined manipulation of the user triggers the following operation of the control circuit 24 of the cellular phone 3. The control circuit 24 determines whether the coupon information is stored in the memory 30 at the time. When determining that the coupon information is stored in the memory 30, the control circuit 24 displays the coupon information display inquiry window which asks the user whether to display the coupon information in the display portion 29 (B3), as illustrated in FIG. 7A. Thereafter, the cellular phone 3, the server 4, the center apparatus 5, and the payment apparatus 6 operate similar to the two-party cooperative state to permit the vehicular navigation apparatus 2 and the cellular phone 3 to cooperatively operate.

The above explained the case that the user drives the vehicle A and travels a road, whereas the vehicular navigation apparatus 2 and the cellular phone 3 do not cooperatively operate during traveling the road, but the cellular phone 3 operates singly. In such a case, the position information detected by the cellular phone 3 is transmitted to the server 4 from the cellular phone 3. The user can thereby acquire the coupon information available at the shop according to the position information. When the user makes payment using the coupon information, the give-back information is transmitted to the server 4 from the payment apparatus 6. The profit that the shop obtained from the user purchasing goods using the coupon information is partially returned to the third-party administrative entity managing the server 4.

The above configuration of the present embodiment defines (i) the two-party cooperative state to permit the vehicular navigation apparatus 2 and the cellular phone 3 cooperatively operate and (ii) the cellular singly-operative state to permit the cellular phone 3 operates singly. In both the states, the server 4 acquires the position information which can determine the user's position from the cellular phone 3, provides the acquired position information to the center apparatus 5, acquires the coupon information, which is available at the payment apparatus 6 installed in the shop that the user is expected to visit, from the center apparatus 5, and provides the acquired coupon information to the user. This increases an incentive that the user is going to visit the shop and is going to purchase goods using the coupon information. The user may purchase goods using the coupon information. This permits the server 4 to obtain as the give-back information a part of the profit obtained by the payment apparatus 6 or the shop.

The comparison between the two-party cooperative state and the cellular singly-operative state results in that the two-party cooperative state provides more advantage than the cellular singly-operative state as follows. That is, the accuracy to detect the position in the two-party cooperative state is higher than that in the cellular singly-operative state. Suppose that a general road is parallel with an expressway. In such a case, the two-party cooperative state may determine whether the vehicle A runs the expressway or the general road; the cellular singly-operative state may not determine whether the vehicle A runs the expressway or the general road. Therefore, the cellular singly-operative state may provide a disadvantage in the application that transmits the coupon information of the shop the user is expected to visit according to the position of the user who possesses the cellular phone 3 from the server 4 to the cellular phone 3.

Figure 8A:
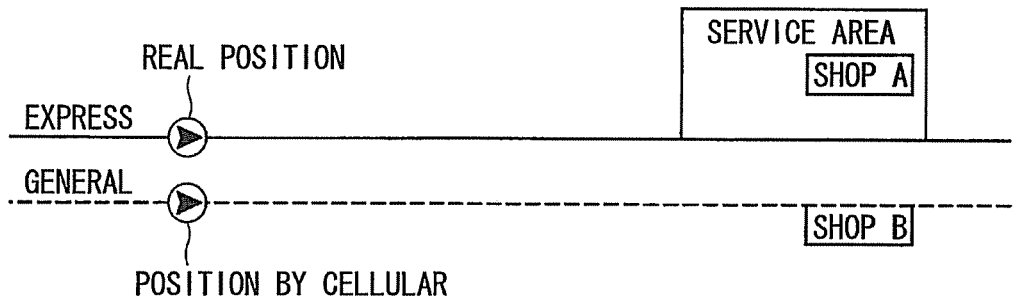
FIG. 8A is diagram illustrating a relationship between a real travel position and a travel position detected by the cellular phone.

Refer to FIG. 8A. A general road is parallel with an expressway. When the vehicle runs the expressway under the cellular singly-operative state, the cellular phone 3 may detect a position on the general road, thereby transmitting the position on the general road detected by the cellular phone 3 to the server 4. As a result, the server 4 may transmit the coupon information available at the shop B along the general road to the cellular phone 3. The user who really (or actually) runs the expressway cannot use the coupon information stored in the cellular phone 3.

Figure 8B:
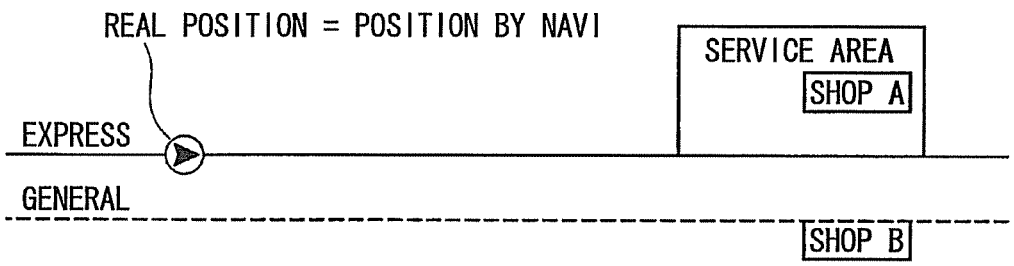
FIG. 8B is a diagram illustrating a relationship among a real travel position and a travel position detected by the vehicular navigation apparatus.

Refer to FIG. 8B where the vehicle runs the expressway under the two-party cooperative state. In this case, even if the cellular phone 3 detects a position on the general road, the vehicular navigation apparatus 2 detects a position on the expressway. Thereby the cellular phone 3 transmits the position on the expressway detected by the vehicular navigation apparatus 2 to the server 4. As a result, the server 4 may transmit the coupon information available at the shop A in the service area attached to the expressway to the cellular phone 3. The user who actually travels the expressway can use the coupon information stored in the cellular phone 3.

Such situation may not occur only when an expressway and a general road are parallel with each other. More than one general road may exist in parallel. One-way road may have many lanes. For example, in spite of running the right-most lane in the heading direction, the coupon information available at the shop along the left-most lane may be transmitted. The two-party cooperative state to permit the vehicular navigation apparatus 2 and the cellular phone 3 cooperatively operate helps prevent the above disadvantage from occurring.

Figure 9:
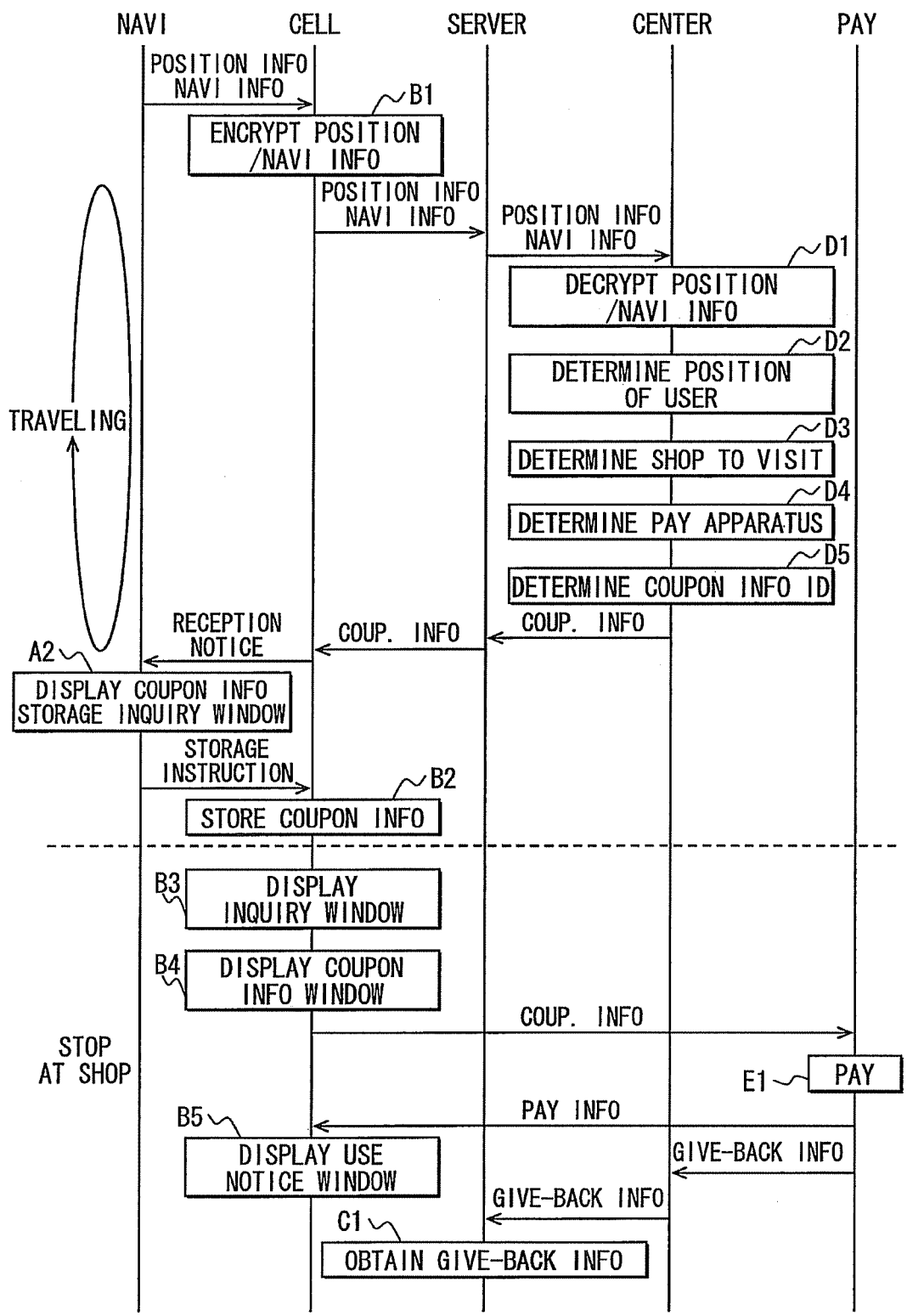
FIG. 9 is another sequence diagram.

The above explained the case that the control circuit 7 in the cellular phone 3 automatically or forcibly stores the coupon information received from the server 4 in the memory 30. There is no need to be limited thereto. It may be premised that the user is confirmed whether to have an intention to store the coupon information received from the server 4 in the memory 30 in the cellular phone 3. Refer to FIG. 9. When receiving the coupon information transmitted from the server 4 by the wide area communicator 25 via the wide area communication link, the control circuit 24 of the cellular phone 3 transmits a coupon information reception notice signal, which indicates that the coupon information is received, to the vehicular navigation apparatus 2 via the BT communication link from the BT communicator 27.

Figure 6B:
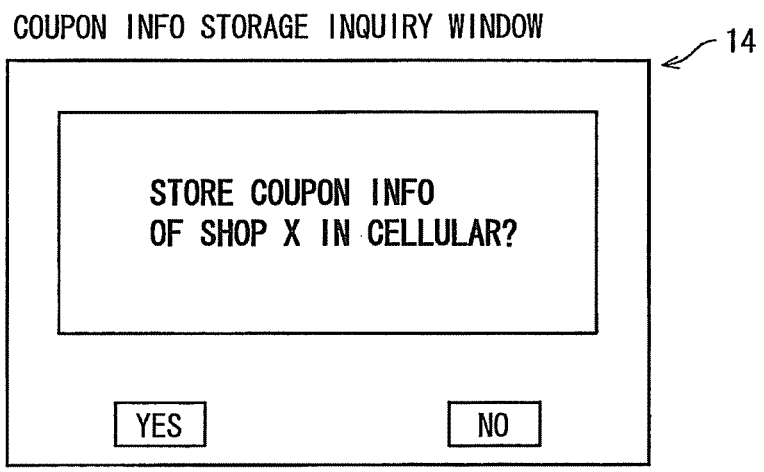

When determining the reception of the coupon information reception notice signal transmitted from the cellular phone 3 by the BT communicator 12 via the BT communication link, the control circuit 7 of the vehicular navigation apparatus 2 displays the coupon information storage inquiry window, which asks the user whether to store the coupon information in the memory 30, in the display portion 14 (A2), as illustrated in FIG. 6B. In such a case, the user can select whether to store the coupon information.

When determining that the user selects storing the coupon information and presses "YES" button on the coupon information storage inquiry window, the control circuit 7 transmits the coupon information storage instruction signal to the cellular phone 3 via the BT communication link from the BT communicator 12.

When determining the reception of the coupon information storage instruction signal transmitted from the vehicular navigation apparatus 2 by the BT communicator 27 via the BT communication link, the control circuit 24 of the cellular phone 3 stores the received coupon information to be associated with the payment apparatus 6 in the memory 30 (B2). In this case, the user manipulates to select whether to store the coupon information in the cellular phone 3 while traveling the expressway. While prohibiting the driver's manipulation, a fellow passenger or occupant other than a driver may be permitted to manipulate, which prevents the interference to the driver driving the vehicle and ensures the safety under the driving. Moreover, the speech recognition may be used for the user to utter a speech so as to store the coupon information in the cellular phone 3.

Further, the above explained the case that when the vehicular navigation apparatus 2 transmits the position information and the navigation information to the server 4 via the cellular phone 3, the cellular phone 3 encrypts the position information and the navigation information which are received from the vehicular navigation apparatus 2 to transmit to the server 4. The vehicular navigation apparatus 2 may encrypt the position information and the navigation information to transmit to the cellular phone 3. In such a case, the cellular phone 3 transmits the position information and the navigation information, which are received from the vehicular navigation apparatus 2 and encrypted, to the server 4 as it is. That is, even if receiving the position information encrypted from the vehicular navigation apparatus 2, the cellular phone 3 does not use the received position information. It is thus unnecessary to have the function to decrypt the encrypted position information. Moreover, this may avoid alteration of the position information of the vehicular navigation apparatus 2 in the cellular phone 3. The technology to encrypt the position information may include well-known ones such as a public key encryption system to encrypt using a public key and decrypt using a secret key, and a common key encryption system to encrypt and decrypt using a common key. In the public key encryption system, the center apparatus 5 manages a public key and a secret key, whereas the vehicular navigation apparatus 2 encrypts the position information using the public key acquired from the center 5. In contrast, in the common key encryption system, the center apparatus 5 manages a common key, whereas the vehicular navigation apparatus 2 encrypts the position information using the common key acquired from the center 5.

Moreover, the above explained the case that the server 4 provides the user with the coupon information corresponding to the traveling position of the vehicle A as a service provided to the user. Any other services may be provided. The user may visit a shop which is a restaurant. The server 4 may provide a congestion state of the restaurant. The server 4 may receive a reservation using the restaurant from the user. For example, the user may visit a shop which is a souvenir shop. The server 4 may receive an order of a souvenir. Moreover, the server 4 may provide the user with the advertising information such as an introduction of the shop or the event information such as an event taking place corresponding to the travel position of the vehicle A. Furthermore, there is no need to be limited to the case where the vehicle A is traveling a road. When the position information acquired by the vehicular navigation apparatus 2 has a higher accuracy than that by the cellular phone 3, the present embodiment may effectively apply to any situation or any service.

Moreover, the server 4 may prepare a driving plan based on the destination and route which are included in the navigation information received from the vehicular navigation apparatus 2, and provide the user with the prepared driving plan. Moreover, the user may be provided with traffic information such as traffic congestion, traffic accident, and traffic regulation, or weather information, with respect to the areas the vehicle A is expected to travel in the future.

The present embodiment provides an advantage as follows. When the vehicular navigation apparatus 2 and the cellular phone 3 connect the Bluetooth communication link, the position information detected by the vehicular navigation apparatus 2 is transmitted to the server 4 from the cellular phone 3. The server 4 determines the position of the user who is provided with a service based on the position information received from the cellular phone 3, and provides the service to the user of which the position is determined. The position of the user who is provided with a service can be therefore determined accurately, enabling an accurate provision of the service to the user.

The present disclosure is not limited only to the above-mentioned embodiment, and can be modified or extended as follows. The vehicular navigation apparatus 2 may be an apparatus built into the vehicle as a navigation ECU. The vehicular navigation apparatus 2 and the cellular phone 3 may transmit and receive a variety of information and signals by performing a short range wireless communication such as wireless LAN or near field communication (NFC) other than the BT communication. Moreover, the vehicular navigation apparatus 2 and the cellular phone 3 may transmit and receive a variety of information and signals by performing wired or cable communication therebetween.

The coupon information needs not to be limited to be stored in the memory 30 of the cellular phone 3. The coupon information may be printed on a paper or the like and provided to the user who may use the printed coupon information at the shop. The server 4 may include the function which the center apparatus 5 has.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A service provision system comprising:
   a portable terminal including a terminal-side position detector to detect a first position based on a global positioning system (GPS) signal received from GPS Satellites;
   an in-vehicle apparatus mounted to a vehicle, the in-vehicle apparatus including a vehicle-side position detector to detect a second position based on a GPS signal received from GPS Satellites; and
   a server to receive position information from the portable terminal, determine service information in response to the position information received, and transmit the service information to the portable terminal,
   the portable terminal acquiring the second position detected by the vehicle-side position detector from the in-vehicle apparatus and transmitting the second position as the position information to the server when the portable terminal communicates with the in-vehicle apparatus,
   the portable terminal transmitting the first position detected by the terminal-side position detector as the position information to the server when the portable terminal is not communicating with the in-vehicle apparatus.

2. The service provision system according to claim 1, wherein:
   the in-vehicle apparatus further includes a vehicle information acquirer to acquire vehicle information from a different apparatus mounted to the vehicle; and
   the vehicle-side position detector detects the second position based on the vehicle information in addition to the GPS signal received from the GPS Satellites.

3. The service provision system according to claim 1, wherein:
   the portable terminal includes a terminal-side encryption section to encrypt the second position acquired from the in-vehicle apparatus; and
   when the portable terminal is communicates with the in-vehicle apparatus, the portable terminal encrypts the second position acquired from the in-vehicle apparatus with the terminal-side encryption section and transmits the second position encrypted as the position information to the server.

4. The service provision system according to claim 1, wherein:
   the in-vehicle apparatus includes a vehicle-side encryption section to encrypt the second position detected by the vehicle-side position detector; and
   when the portable terminal communicates with the in-vehicle apparatus, the portable terminal acquires the second position, which is detected by the vehicle-side position detector and is encrypted by the vehicle-side encryption section, from the in-vehicle apparatus and transmits the second position encrypted to the server as the position information.

5. The service provision system according to claim 1, wherein:
   the in-vehicle apparatus further includes a navigation information acquirer to acquire navigation information; and
   when the portable terminal communicates with the in-vehicle apparatus, the portable terminal acquires the navigation information, in addition to the second position detected by the vehicle-side position detector, from the in-vehicle apparatus and transmits the navigation information to the server in addition to the second position.

6. The service provision system according to claim 5, wherein:
   when the in-vehicle apparatus is communicated with the portable terminal, the in-vehicle apparatus periodically transmits the navigation information and the second position detected by the vehicle-side position detector to the portable terminal.

7. The service provision system according to claim 1, wherein:
   when the service information transmitted from the server to the portable terminal is executed in the portable terminal, the server is given back a portion of a profit resulting from the executing of the service information in the portable terminal.

8. The service provision system according to claim 1, wherein:
the server determines a time-series variation of positions determined based on the position information received from the portable terminal more than once, and determines a service provider to provide the service information.

9. The service provision system according to claim 1, wherein:
when the portable terminal communicates with the in-vehicle apparatus, the portable terminal stores the service information upon receiving the service information from the server, and transmits a service information storage notice to the in-vehicle apparatus, the service information storage notice indicating that the service information from the server is stored in the portable terminal; and
the in-vehicle apparatus notifies a user that the service information is stored in the portable terminal upon receiving the service information storage notice from the portable terminal.

10. The service provision system according to claim 9, wherein:
when the vehicle passes through a position where the service information is available, the portable terminal erases the service information that is stored in the portable terminal.

11. The service provision system according to claim 1, wherein:
when the portable terminal communicates with the in-vehicle apparatus,
the portable terminal transmits a service information reception notice to the in-vehicle apparatus, the service information reception notice indicating that the service information is received by the portable terminal; and
the in-vehicle apparatus asks a user whether to store the service information in the portable terminal upon receiving the service information reception notice from the portable terminal.

12. The service provision system according to claim 1, wherein the portable terminal is a cellular phone and the in-vehicle apparatus is a navigation system.

13. The service provision system according to claim 12, wherein the portable terminal is separate from the in-vehicle apparatus.

14. The service provision system according to claim 1, wherein the portable terminal is separate from the in-vehicle apparatus.

15. A service provision system comprising:
a portable terminal including a terminal-side position detector to detect a first position based on a global positioning system (GPS) signal received from GPS Satellites;
an in-vehicle apparatus different from the portable terminal and fixedly mounted to a vehicle, the in-vehicle apparatus including a vehicle-side position detector to detect a second position based on a GPS signal received from GPS Satellites, the in-vehicle apparatus transmitting the second position detected by the vehicle-side position detector to the portable terminal when the portable terminal communicates with the in-vehicle apparatus; and
a server to receive position information from the portable terminal, determine service information in response to the position information received, and transmit the service information to the portable terminal,
the portable terminal being further configured to determine whether or not the second position detected by the vehicle-side position detector is received from the in-vehicle apparatus when the in-vehicle apparatus communicates with the portable terminal,
wherein:
when determining that the second position is received from the in-vehicle apparatus, the portable terminal transmits the second position as the position information to the server,
when determining that the second position is not received from the in-vehicle apparatus, the portable terminal transmits the first position detected by the terminal-side position detector as the position information to the server.

* * * * *